United States Patent
Xi et al.

(10) Patent No.: US 10,476,387 B1
(45) Date of Patent: Nov. 12, 2019

(54) SWITCHING FREQUENCY CONTROL APPARATUS AND CONTROL METHOD THEREOF

(71) Applicant: M3 Technology Inc., Taipei (TW)

(72) Inventors: Xiaoyu Xi, Dallas, TX (US); Bo Yang, Allen, TX (US); Lou Nuo, Xian (CN)

(73) Assignee: M3 Technology Inc., Taipei (TW)

( * ) Notice: Subject to any disclaimer, the term of this patent is extended or adjusted under 35 U.S.C. 154(b) by 0 days.

(21) Appl. No.: 15/980,846

(22) Filed: May 16, 2018

(51) Int. Cl.
  *H02M 3/156* (2006.01)
  *H02M 3/158* (2006.01)

(52) U.S. Cl.
  CPC .......... *H02M 3/156* (2013.01); *H02M 3/158* (2013.01)

(58) Field of Classification Search
  CPC ........ H02M 3/155–3/1588; H02M 2001/0003; H02M 2001/0006; H02M 2001/0009
  See application file for complete search history.

(56) References Cited

U.S. PATENT DOCUMENTS

| | | | |
|---|---|---|---|
| 9,356,510 B2 * | 5/2016 | Jiang | H02M 3/156 |
| 9,774,255 B2 | 9/2017 | Xi et al. | |
| 2013/0088208 A1 * | 4/2013 | Noda | H02M 3/158 323/271 |
| 2013/0313995 A1 * | 11/2013 | Sadwick | H05B 37/02 315/287 |
| 2017/0194858 A1 * | 7/2017 | Villot | H02M 3/156 |

* cited by examiner

*Primary Examiner* — Kyle J Moody
*Assistant Examiner* — Peter M Novak
(74) *Attorney, Agent, or Firm* — Slater Matsil, LLP

(57) ABSTRACT

A switch frequency control apparatus comprises a timer coupled between a bias voltage and ground, wherein the timer comprises a first input configured to receive a ramp, a second input configured to receive a threshold voltage and an output configured to be connected to an input of a PWM circuit, wherein the output of the timer is used for setting either a constant on-time or a constant off-time of a power converter and a threshold generator coupled between the bias voltage and ground, wherein the threshold generator is configured to receive a plurality of control signals of the power converter and generate the threshold voltage based upon a duty cycle of the power converter.

20 Claims, 10 Drawing Sheets

SWITCHING FREQUENCY CONTROL APPARATUS AND CONTROL METHOD THEREOF

TECHNICAL FIELD

The present invention relates to a control scheme of a power converter, and, in particular embodiments, to a power converter employing a constant on-time control scheme or a constant off-time control scheme with a constant switching frequency under various operating conditions.

BACKGROUND

As technologies further advance, a variety of electronic devices, such as mobile phones, tablet PCs, digital cameras, MP3 players and/or the like, have become popular. Each electronic device requires direct current power at a substantially constant voltage which may be regulated within a specified tolerance even when the current drawn by the electronic device may vary over a wide range. In order to maintain the voltage within the specified tolerance, a power converter (e.g., a switching dc/dc converter) coupled to the electronic device provides very fast transient responses, while keeping a stable output voltage under various load transients.

Hysteretic-based power converter control schemes such as the constant on-time scheme or the constant off-time scheme can enable power converters to provide fast transient responses. A buck converter employing the constant on-time control scheme may only comprise a feedback comparator and an on-timer. In operation, the feedback circuit of the power converter (e.g., buck converter) directly compares a feedback signal with an internal reference. When the feedback signal falls below the internal reference, the high-side switch of the power converter is turned on and remains on for the on-timer duration. As a result of turning on the high side switch, the inductor current of the power converter rises. The high-side switch of the power converter turns off when the on-timer expires, and does not turn on until the feedback signal falls below the internal reference again. In summary, when the constant on-time control scheme is employed in a power converter, the on-time of the high-side switch of the power converter is terminated by the on-timer. The off-time of the high-side switch of the power converter is terminated by the feedback comparator. Similarly, a boost converter employing a constant off-time control scheme can achieve fast transient responses.

The power converters employing the constant on-time control scheme or the constant off-time control scheme are simple to design. However, the constant on-time control scheme and the constant off-time control scheme have an unwanted application issue. Under different operating conditions, the switching frequency of the constant on/off time controlled power converter varies in a wide range. Such a switching frequency variation is not preferable in many applications.

It would be desirable to provide an apparatus and/or a method for enabling the power converters employing the constant on-time control scheme or the constant off-time control to have a fixed switching frequency under a variety of operating conditions.

SUMMARY

In particular embodiments, a control scheme of a constant on/off time controlled power converter may achieve a fixed switching frequency under a variety of operating conditions.

In accordance with an embodiment, an apparatus comprises a timer coupled between a bias voltage and ground, wherein the timer comprises a first input configured to receive a ramp, a second input configured to receive a threshold voltage and an output configured to be connected to an input of a PWM circuit, wherein the output of the timer is used for setting either an on-time or an off-time of a power converter and a threshold generator coupled between the bias voltage and ground, wherein the threshold generator is configured to receive a plurality of control signals of the power converter and generate the threshold voltage based upon a duty cycle of the power converter.

In accordance with another embodiment, a method comprises generating a ramp using a bias voltage of a power converter, generating a threshold voltage proportional to either a duty cycle or one minus a duty cycle of the power converter, comparing the ramp with the threshold voltage using a comparator and terminating or initiating a PWM signal of the power converter based upon a comparing result generated by the comparator.

In accordance with yet another embodiment, a converter comprises a high-side switch and a low-side switch connected in series, an inductor connected to a common node of the high-side switch and the low-side switch and a control apparatus configured to generate gate drive signals for the high-side switch and the low-side switch, wherein the control apparatus comprises a timer for setting either an on-time or an off-time of the converter and a threshold generator configured to receive the gate drive signals of the converter and generate a threshold voltage based upon a duty cycle of the converter.

An advantage of a preferred embodiment of the present disclosure is generating a ramp threshold proportional to the duty cycle (D) of a step-down power converter or one minus the duty cycle (1-D) of a step-up power converter. As a result having this ramp threshold, the power converter can achieve a fixed or an almost fixed switching frequency under different operating conditions.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a constant off-time/on-time controlled power converter operating in a fixed switching frequency or an almost fixed switching frequency under various operating conditions. The invention may also be applied, however, to a variety of power converters. Hereinafter, various embodiments will be explained in detail with reference to the accompanying drawings.

Figure 1:
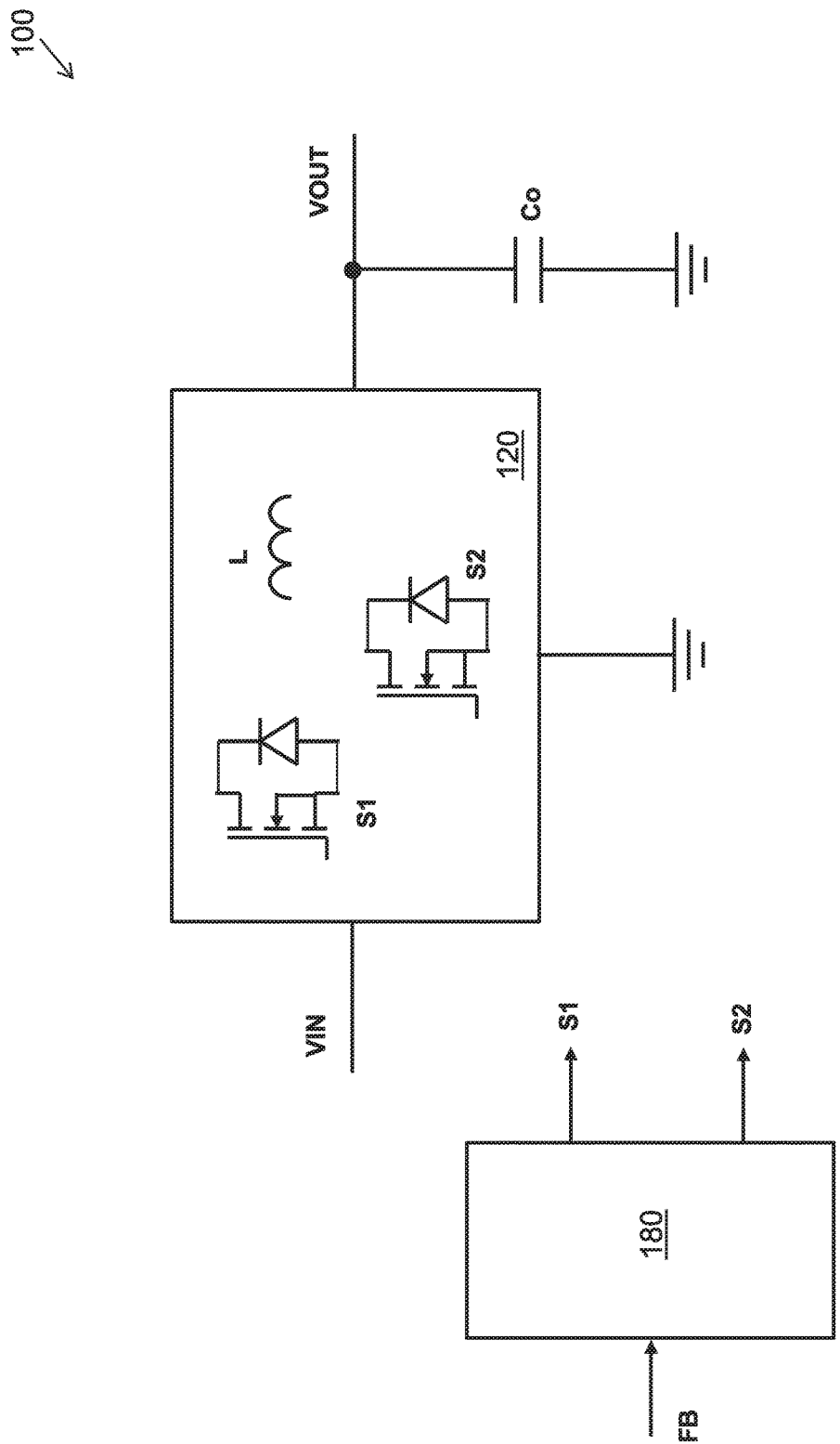
FIG. 1 illustrates a block diagram of a control apparatus of a power converter in accordance with various embodiments of the present disclosure.

FIG. 1 illustrates a block diagram of a control apparatus of a power converter in accordance with various embodiments of the present disclosure. The power converter 100 is a step-up power converter (also known as a boost converter). Alternatively, the power converter 100 is a step-down power converter (also known as a buck converter). The operation of the power converter 100 is controlled by a control apparatus 180.

As shown in FIG. 1, the power converter 100 includes a first switch S1, a second switch S2, an inductor L and an output capacitor Co. In some embodiments, the power converter 100 is implemented as a step-up power converter. The first switch S1 and the second switch S2 are connected in series between an output terminal VOUT and ground. The inductor L is connected between the common node of the first switch S and the second switch S2 and an input terminal VIN.

In alternative embodiments, the power converter 100 is implemented as a step-down power converter. The first switch S1 and the second switch S2 are connected in series between the input terminal VIN and ground. The inductor L is connected between the common node of the first switch S1 and the second switch S2, and the output capacitor Co.

Throughout the description, when the power converter 100 is implemented as a step-down power converter, the first switch S1 may be alternatively referred to as a high-side switch of the power converter 100, and the second switch S2 may be alternatively referred to as a low-side switch of the power converter 100. A ratio of the turn-on time of the first switch S1 to the switching period of the power converter 100 is a duty cycle (D) of the step-down power converter.

Throughout the description, when the power converter 100 is implemented as a step-up power converter, the first switch S1 may be alternatively referred to as a low-side switch of the power converter 100, and the second switch S2 may be alternatively referred to as a high-side switch of the power converter 100. A ratio of the turn-on time of the first switch S1 to the switching period of the power converter 100 is a duty cycle (D) of the step-up power converter. A ratio of the turn-off time of the first switch S1 to the switching period of the power converter 100 is an off-time duty cycle (I-D) of the step-up power converter.

In some embodiments, the power converter 100 is implemented as a constant on-time power converter when the first switch S1, the second switch S2 and the inductor L form a step-down power converter. In alternative embodiments, the power converter 100 may be implemented as a constant off-time power converter when the first switch S1, the second switch S2 and the inductor L form a step-up power converter.

The first switch S1 and the second switch S2 are implemented as n-type transistors as shown in FIG. 1. The gate of the first switch S1 and the gate of the second switch S2 are controlled by the control apparatus 180.

It should be noted that the power converter 100 shown in FIG. 1 is merely an example, which should not unduly limit the scope of the claims. One of ordinary skill in the art would recognize many variations, alternatives, and modifications. For example, the first switch S1 may be implemented as a p-type transistor. Furthermore, the switch of the power converter 100 (e.g., the first switch S1) may be implemented as a plurality of n-type transistors connected in parallel.

In some embodiments, when the power converter 100 is implemented as a step-down power converter, the control apparatus 180 may apply a constant on-time control scheme to the power converter 100. In addition, under different operation conditions, the control apparatus 180 may determine the on-time of the high-side switch of the step-down power converter through comparing a ramp signal with a threshold voltage. The ramp signal is generated by charging a capacitor using a constant current source. The threshold voltage is generated by a threshold voltage generator. In order to have a constant switching frequency or an almost fixed switching frequency, the threshold voltage is proportional to the duty cycle (D) of the step-down power converter.

In alternative embodiments, when the power converter 100 is implemented as a step-up power converter, the control apparatus 180 may apply a constant off-time control scheme to the power converter 100. The control apparatus 180 may determine the off-time of the low-side switch of the step-up power converter through comparing a ramp signal with a threshold voltage. The ramp signal is generated by charging a capacitor using a constant current source. The threshold voltage is generated by a threshold voltage generator. In order to have a constant switching frequency, the threshold voltage is proportional to one minus the duty cycle (1−D) of the step-up power converter.

As shown in FIG. 1, the control apparatus 180 is configured to receive a plurality of signals such as FB, which is proportional to the output voltage VOUT. Furthermore, depending on different applications and design needs, the control apparatus 180 may be configured to receive other suitable signals such as the input voltage VIN. Based upon the output voltage VOUT and/or the input voltage VIN, the control apparatus 180 generates two gate signals for controlling the operation of the power converter 100. The detailed operation of the control apparatus 180 will be described below with FIGS. 2-9.

Figure 2:
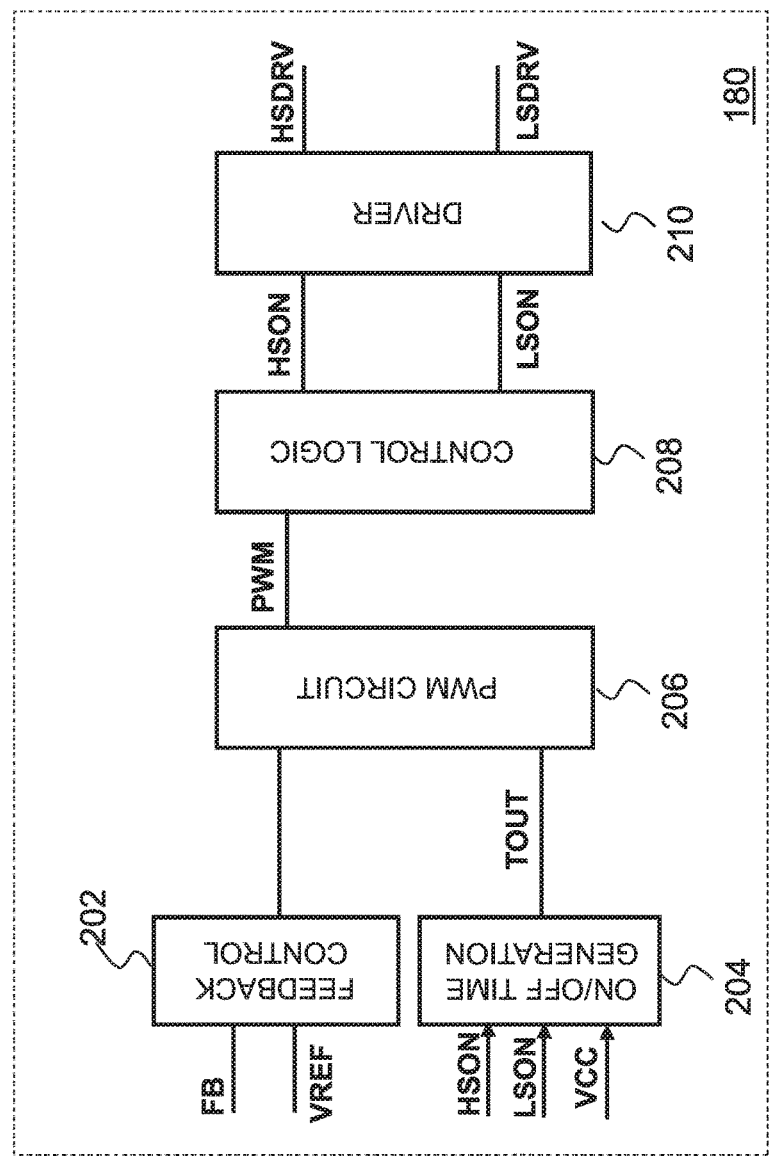
FIG. 2 illustrates a detailed block diagram of the control apparatus of the power converter shown in FIG. 1 in accordance with various embodiments of the present disclosure.

FIG. 2 illustrates a detailed block diagram of the control apparatus of the power converter shown in FIG. 1 in accordance with various embodiments of the present disclosure. The control apparatus 180 of the power converter 100 comprises a feedback control apparatus 202, an on/off time generation apparatus 204, a pulse width modulation (PWM) circuit 206, a control logic apparatus 208 and a driver circuit 210.

In some embodiments, the feedback control apparatus 202 is employed to monitor the output voltage of the power converter 100 (shown in FIG. 1). The input signal FB of the feedback control apparatus 202 is a voltage signal proportional to the output voltage of the power converter 100. The input signal REF of the feedback control apparatus 202 is a predetermined reference voltage. In some embodiments, the input signal REF is equal to 0.8 V.

As shown in FIG. 2, the on/off time generation apparatus 204 is configured to receive a high-side gate drive signal HSON, a low-side gate drive signal LSON, a bias voltage VCC. In alternative embodiments, the on/off time generation apparatus 204 may be configured to receive other suitable control signals such as a PWM signal. The high-side gate drive signal HSON and the low-side gate drive signal LSON are generated by the control logic apparatus 208 as shown in FIG. 2. The PWM signal is generated by the PWM circuit 206.

Depending on different applications and design needs, the on/off time generation apparatus 204 may be implemented either as an on-time generation apparatus or an off-time generation apparatus. For example, when the power converter 100 is a step-down power converter, the on/off time generation apparatus 204 is implemented as an on-time generation apparatus. Throughout the description, the on/off time generation apparatus 204 is alternatively referred to as the on-time generation apparatus 204 when the power converter 100 is a step-down power converter.

According to the operating principle of constant on-time power converters, the feedback control apparatus 202 is employed to turn on the high-side switch S1 when the detected output voltage FB is below a predetermined reference (e.g., VREF in FIG. 2). More particularly, the turn-on signal of the high-side switch S1 is generated through applying a logic high signal to a first input of the PWM circuit 206 (e.g., a set input of a latch). After the high-side switch S1 has been turned on, the turn-off of the high-side switch Q1 is determined by the on-time generation apparatus 204. The turn-off signal of the high-side switch S1 is generated through applying a logic high signal to a second input of the PWM circuit 206 (e.g., a reset input of a latch). The detailed operation principle of the on-time generation apparatus 204 will be described below with respect to FIG. 7.

In some embodiments, the power converter 100 is a step-up power converter, the on/off time generation apparatus 204 is implemented as an off-time generation apparatus. Throughout the description, the on/off time generation apparatus 204 is alternatively referred to as the off-time generation apparatus 204 when the power converter 100 is a step-up power converter.

According to the operating principle of constant off-time power converters, the off-time generation apparatus 204 is employed to turn on the low-side switch S1 when the off-time timer times out. The turn-on signal of the low-side switch S1 is generated through applying a logic high signal to a first input of the PWM circuit 206 (e.g., a set input of a latch). After the low-side switch S1 has been turned on, the turn-off of the low-side switch S1 is determined by the feedback control apparatus 202. The turn-off signal of the low-side switch S1 is generated through applying a logic high signal applied to a second input of the PWM circuit 206 (e.g., a reset input of a latch). The detailed implementation of the feedback control apparatus 202 will be described below with respect to FIG. 6.

The control logic apparatus 208 has an input connected to an output of the PWM circuit 206. In some embodiments, the control logic apparatus 208 is employed to generate the high-side drive signal HSON and the low-side drive signal LSON based upon the output signal/signals of the PWM circuit 206. Furthermore, the control logic apparatus 208 may be used to produce special features for the high-side drive signal HSON and the low-side drive signal LSON. For example, the control logic apparatus 208 may insert small amount of time between the high-side drive signal HSON and the low-side drive signal LSON. The small amount of time is known as the dead-time between the high-side drive signal HSON and the low-side drive signal LSON.

The control logic apparatus 208 has two outputs. A first output provides a gate drive signal for the high-side switch. The first output signal of the control logic apparatus 208 is defined as HSON as shown in FIG. 2. A second output provides a gate drive signal for the low-side switch. The second output signal of the control logic apparatus 208 is defined as LSON as shown in FIG. 2.

The driver circuit 210 is employed to provide high speed and high current drive capability for the power converter 100. In some embodiments, the driver circuit 210 may further comprise a level-shifting circuit for driving an n-channel high-side switch (e.g., the high-side switch S1).

The driver apparatus 210 has two outputs. A first output is connected to the gate of the high-side switch. The first output signal of the driver circuit 210 is defined as HSDRV as shown in FIG. 2. A second output is connected to the gate of the low-side switch. The second output signal of the driver circuit 210 is defined as LSDRV as shown in FIG. 2.

Figure 3:
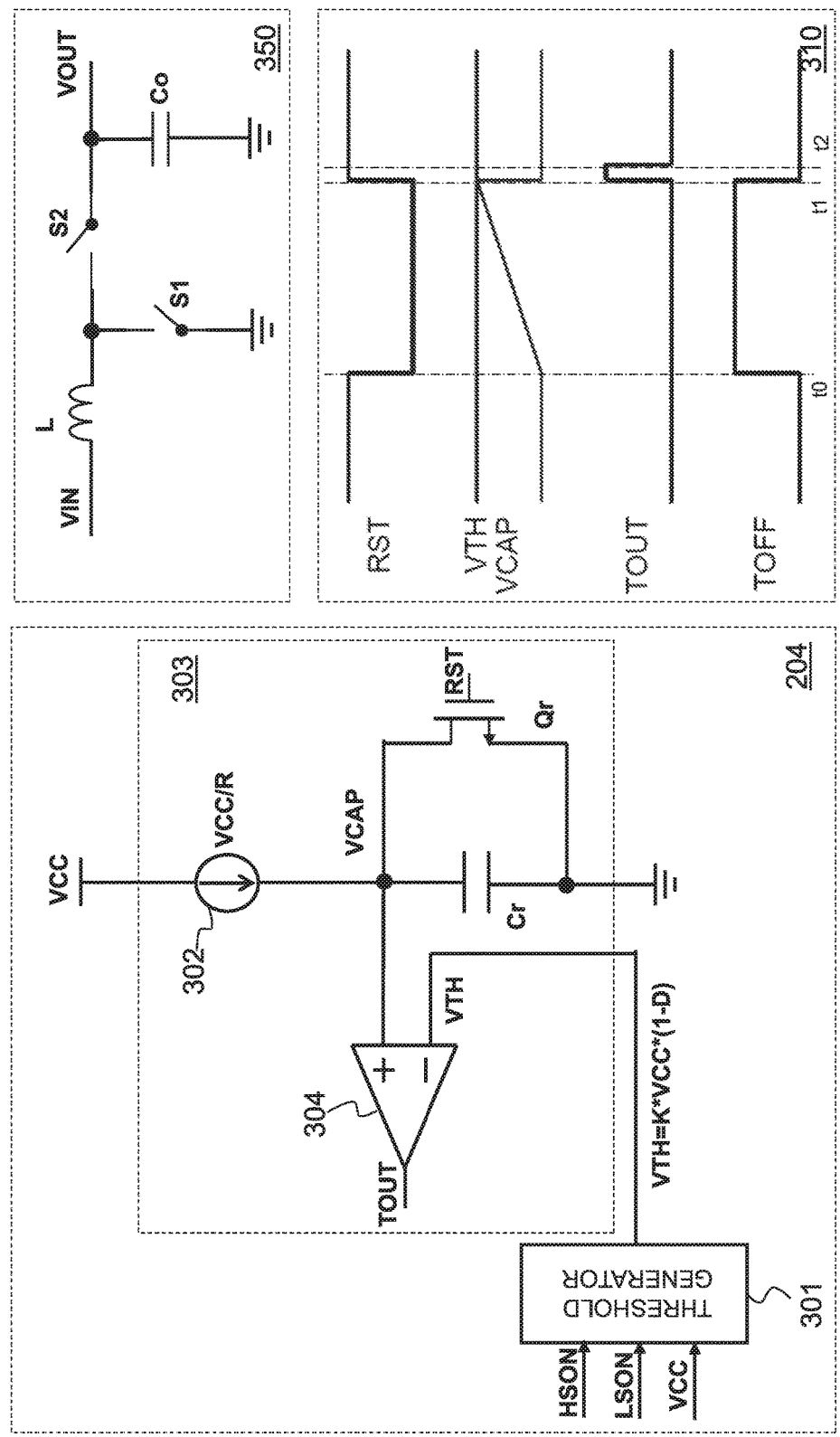
FIG. 3 illustrates a schematic diagram of a first implementation of the on/off time generation apparatus shown in FIG. 2 in accordance with various embodiments of the present disclosure.

FIG. 3 illustrates a schematic diagram of a first implementation of the on/off time generation apparatus shown in FIG. 2 in accordance with various embodiments of the present disclosure. In some embodiments, the power converter 100 is implemented as a step-up power converter 350 as shown in FIG. 3. The on/off time generation apparatus is implemented as an off-time generation apparatus 204.

As shown in FIG. 3, the off-time generation apparatus 204 includes a current source 302, a capacitor Cr, a switch Qr, a comparator 304 and a threshold voltage generation apparatus 301. As shown in FIG. 3, the current source 302, the capacitor Cr, the switch Qr and the comparator 304 form an off-time timer apparatus 303.

As shown in FIG. 3, the current source is coupled to the bias voltage VCC. In some embodiments, the current level of the current source 302 is proportional to the bias voltage VCC. More particularly, the current level of the current source 302 is equal to the bias voltage VCC divided by a predetermined resistor R. The current source 302 is used to charge the capacitor Cr. As shown in the timing diagram 310, from the time instant t0 to the time instant t1, the voltage across Cr is a voltage ramp.

The voltage across the capacitor Cr is fed into a non-inverting input of the comparator 304. The inverting input of the comparator 304 is connected to the threshold voltage generation apparatus 301. The gate of the switch Qr is controlled by a signal RST. In some embodiments, the signal RST is the same as or synchronized to the gate drive signal of the low-side switch S1.

Figure 6:
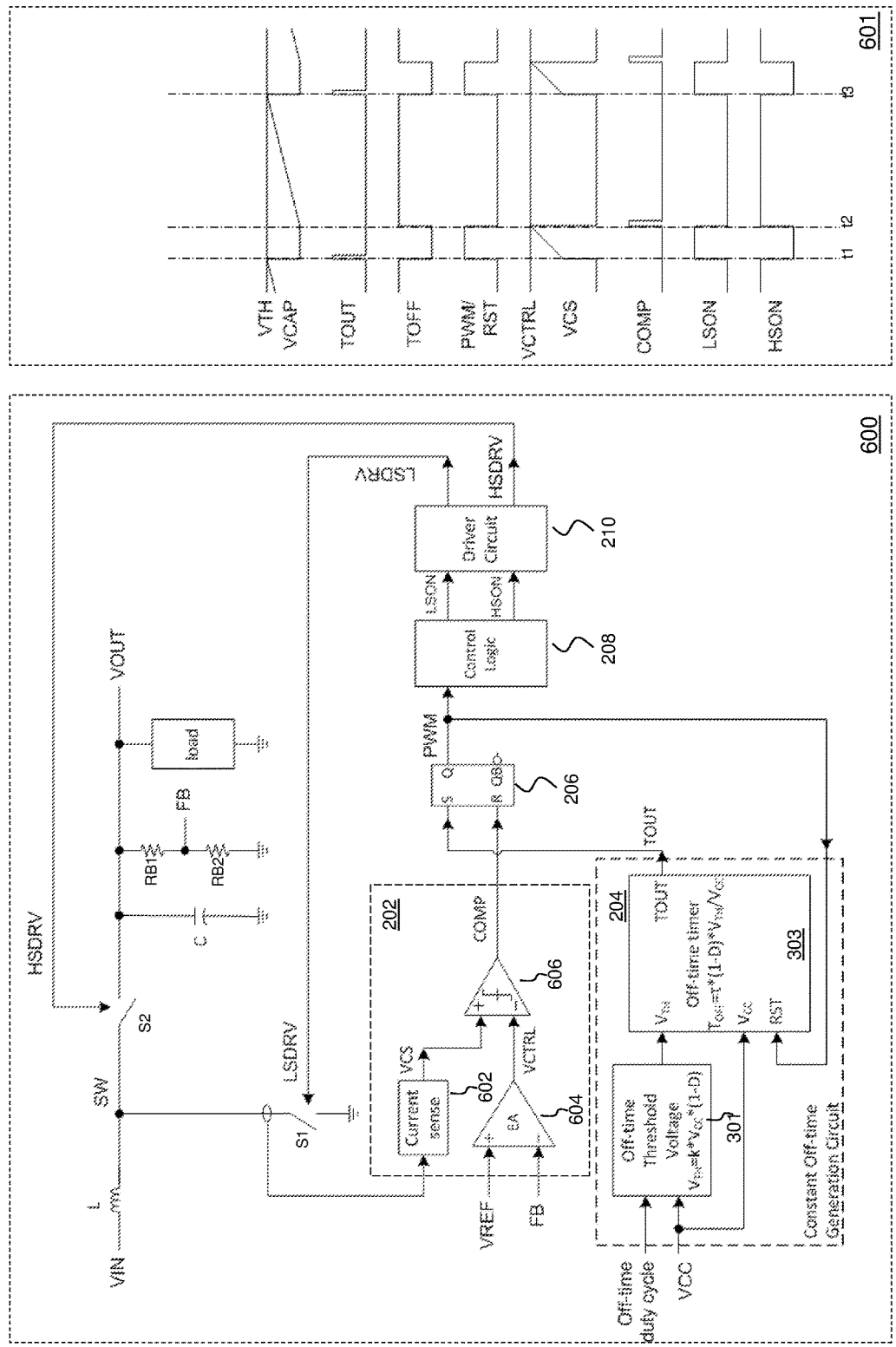
FIG. 6 illustrates a schematic diagram of a step-up power converter employing the constant off-time control scheme in accordance with various embodiments of the present disclosure.

In operation, prior to the time instant t0, the low-side switch S1 is turned on, a logic level "1" and a logic level "0" are applied to the set input and the reset input of a latch respectively (shown in FIG. 6). The latch generates a logic level "1" and applies this signal to the gate of the low-side switch S1 as well as the gate of the switch Qr. The logic level "1" turns on the switch Qr. As a result of turning on the switch Qr, the voltage across the capacitor Cr equal to about zero.

At the time instant t0, the feedback control apparatus 202 turns off the low-side switch S1. In response to the turn-off of the low-side switch S1, the latch generates a logic level "0" and applies this signal (RST) to the gate of the switch Qr. The logic level "0" turns off the switch Qr. As a result of turning off the switch Qr, the current source 302 starts to charge the capacitor Cr in a linear manner from the time instant t0 to the time instant t1.

The voltage across the capacitor Cr (VCAP) is compared with the threshold voltage at the comparator 304. After the voltage across the capacitor Cr reaches the voltage VTH generated by the threshold voltage generation apparatus 301, the output of the comparator 304 generates a logic level "1" at the time instant t1. The logic level "1" turns on the low-side switch S1 at the time instant t1 through the latch. The output of the latch is RST, which generates a logic level "1" at the time instant t1. The logic level "1" of RST turns on the switch Qr. The turned-on switch Qr discharges the capacitor Cr and maintains the voltage across the capacitor Cr equal to about zero. After the capacitor Cr has been discharged, the output of the comparator 304 generates a logic level "0" at the time instant t2.

As shown in FIG. 3, the voltage (VCAP) across the capacitor Cr is a voltage ramp from the time instant t0 to the time instant t1. The voltage ramp is in sync with the off-time of the low-side switch S1. In other words, the voltage ramp starts from zero and linearly rises during the turn-off time of the low-side switch S1.

As shown in FIG. 3, the threshold voltage VTH is proportional to one minus the duty cycle (1-D) of the power converter 100. The detailed structure of the threshold voltage generation apparatus 301 will be described below with respect to FIG. 5.

The relationship between the threshold voltage VTH and the duty cycle of the power converter 100 helps to maintain a constant switching frequency under various operating conditions. More particularly, as the load of the power converter 100 varies, the duty cycle of the power converter 100 may vary accordingly to maintain a regulated output voltage. Without having a threshold voltage VTH proportional to one minus the duty cycle (1-D) of the power converter 100, the switching frequency of the power converter 100 may fluctuate under different loading conditions. By employing the threshold voltage VTH proportional to one minus the duty cycle (1-D) of the power converter 100, the power converter 100 may maintain a stable switching frequency under various loading conditions.

As shown in FIG. 3, the turn-off time of the low-side switch S1 is from the time instant t0 to the time instant t1. The off-time of the low-side switch S1 satisfies the following equations:

$$T_{OFF} \cdot \frac{VCC}{R} = C_r \cdot VTH \quad (1)$$

$$T_{OFF} \cdot \frac{VCC}{R} = C_r \cdot K \cdot VCC \cdot (1-D) \quad (2)$$

Equation (2) can be simplified as the flowing equation:

$$T_{OFF} = C_r \cdot K \cdot R \cdot (1-D) \quad (3)$$

Furthermore, the switching period is given by the following equation:

$$T_{SW} = \frac{T_{OFF}}{1-D} \quad (4)$$

The switching period can be expressed as the following by replacing the off-time in Equation (4) with the off-time in Equation (3).

$$T_{SW} = C_r \cdot K \cdot R = \tau \quad (5)$$

The switching frequency is given by the following equation:

$$F_{SW} = \frac{1}{T_{SW}} = \frac{1}{\tau} \quad (6)$$

As shown by Equation (6) above, the switching frequency of the power converter 100 is kept constant regardless of the duty variations. One advantageous feature of having the threshold voltage VTH shown in FIG. 3 is the switching frequency of the power converter 100 is kept constant or maintained in a narrow range under a variety of loading conditions. Such an almost constant switching frequency helps to improve the performance of the power converter 100. For example, with the constant or almost constant switching frequency, the power converter 100 is able to operate in some high-end power applications such as telecommunication power systems.

Figure 4:
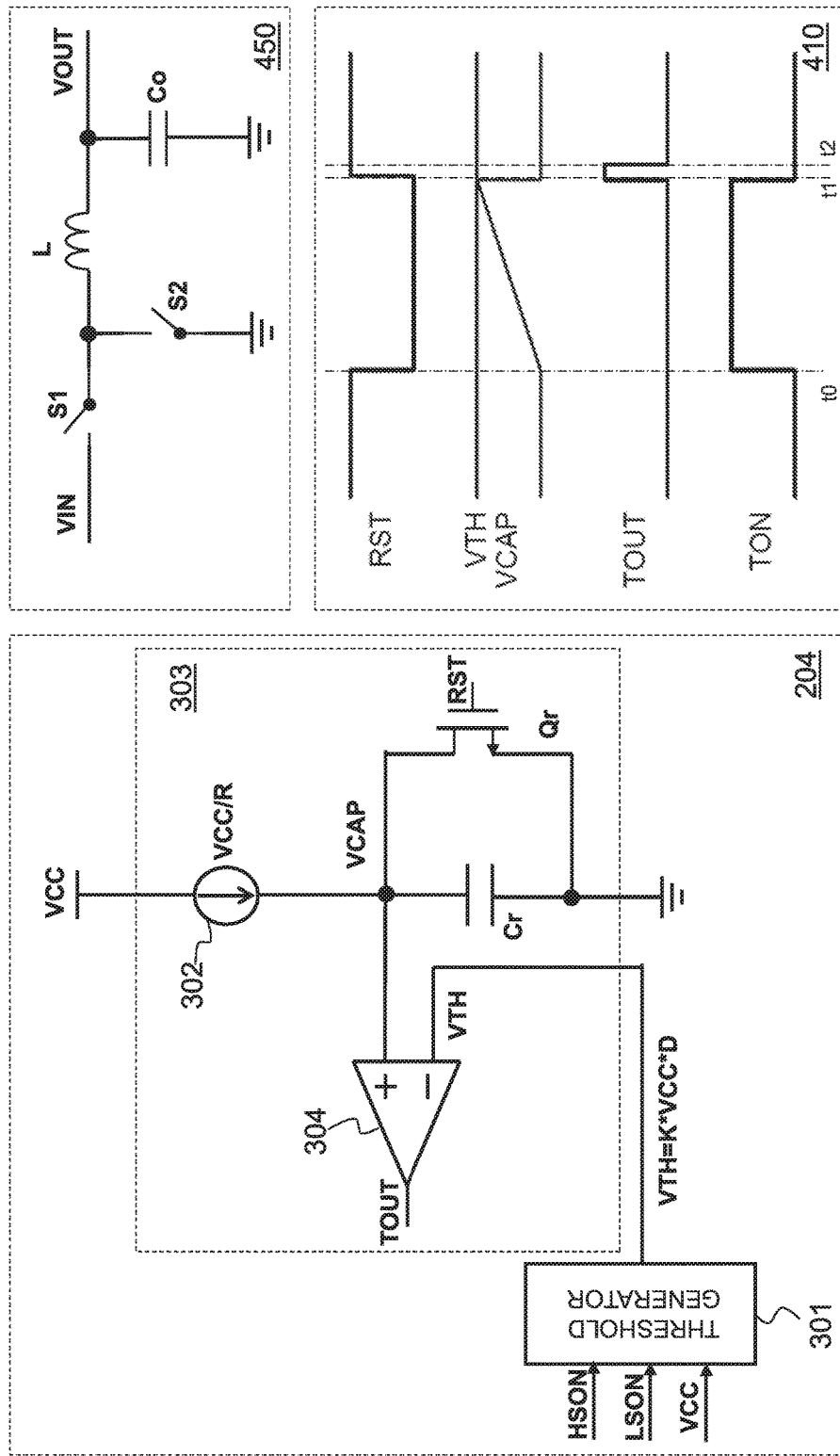
FIG. 4 illustrates a schematic diagram of a second implementation of the on/off time generation apparatus shown in FIG. 2 in accordance with various embodiments of the present disclosure.

FIG. 4 illustrates a schematic diagram of a second implementation of the on/off time generation apparatus shown in FIG. 2 in accordance with various embodiments of the present disclosure. The on/off time generation apparatus 204 shown in FIG. 4 is similar to that shown in FIG. 3 except that the power converter 100 is implemented as a step-down power converter 450. Since the power converter 100 is implemented as a step-down power converter, the on/off time generation apparatus 204 is implemented as an on-time generation apparatus. The structure of the on-time generation apparatus 204 shown in FIG. 4 is similar to the structure of the off-time generation apparatus 204 shown in FIG. 3, and hence is not discussed herein.

Figure 7:
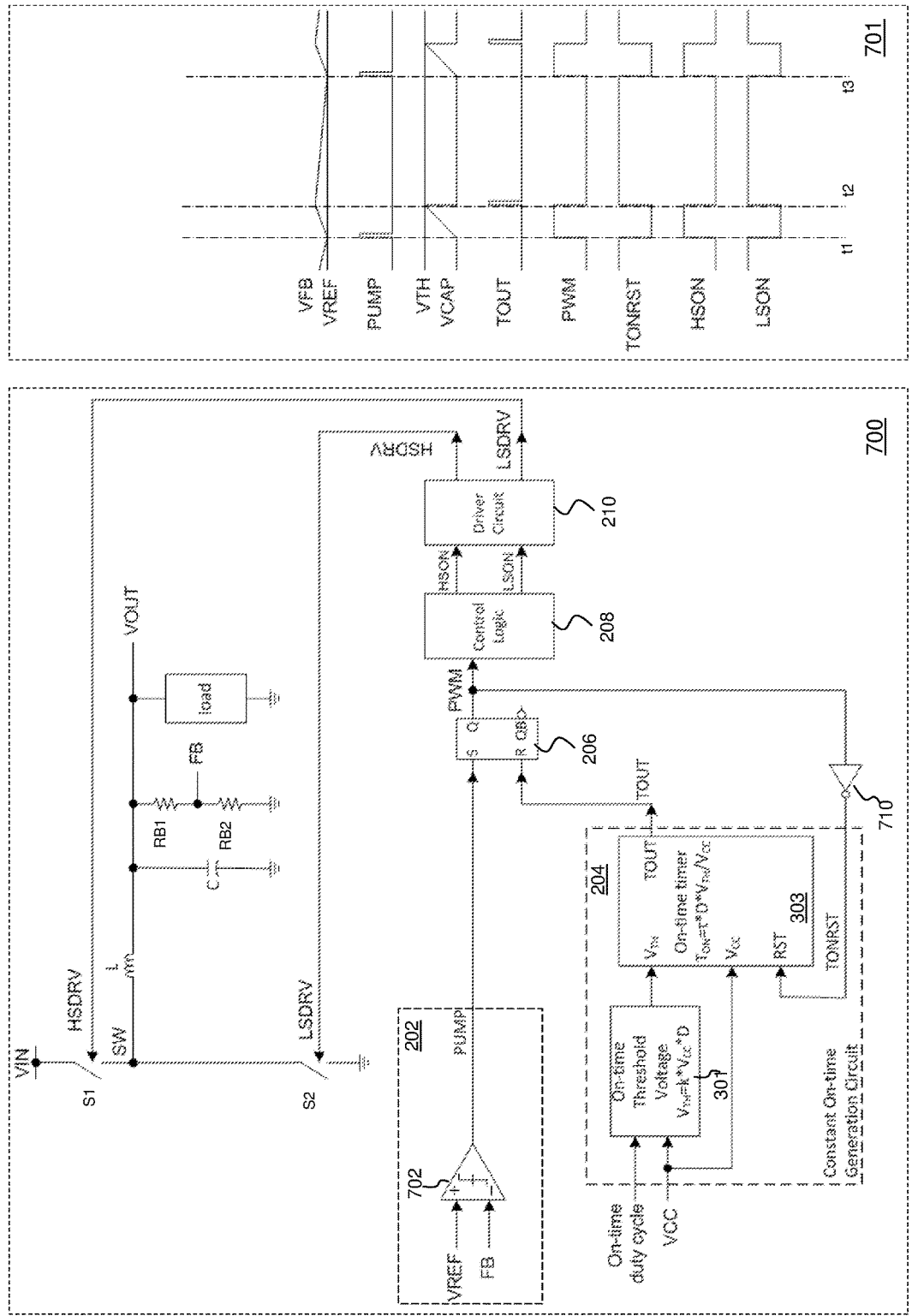
FIG. 7 illustrates a schematic diagram of a step-down power converter employing the constant on-time control scheme in accordance with various embodiments of the present disclosure.

In operation, prior to the time instant t0, the high-side switch S1 is turned off and the low-side switch S2 is turned on, a logic level "0" and a logic level "1" are applied to the set input and the reset input of a latch (e.g., latch 206 shown in FIG. 7). The output of the latch generates a logic level "0" and applies this signal to an inverter (e.g., inverter 710 shown in FIG. 7). A logic level "1" is generated at the output of the inverter. The logic level "1" functions as RST, which is applied to the gate of the switch Qr. The logic level "1" turns on the switch Qr. As a result of turning on the switch Qr, the voltage across the capacitor Cr equal to about zero.

At the time instant t0, the feedback control apparatus 202 turns on the high-side switch S1. In response to the turn-on of the high-side switch S1, a logic level "0" is generated at RST. The logic level "0" turns off the switch Qr. As a result of turning off the switch Qr, the current source 302 starts to charge the capacitor Cr in a linear manner from the time instant t0 to the time instant t1.

The voltage (VCAP) across the capacitor Cr is compared with the threshold voltage VTH at the comparator 304. After the voltage across the capacitor Cr reaches the voltage of the threshold voltage generation apparatus 301, the output of the comparator 304 generates a logic level "1" at the time instant t1. The logic level "1" turns off the high-side switch S1 at the time instant t1. In response to the turn-off of the high-side switch S1, a logic level "1" is generated at RST at the time instant t1. The logic level "1" of RST turns on the switch Qr. The turned-on switch Qr discharges the capacitor Cr and maintains the voltage across the capacitor Cr equal to about zero. After the capacitor Cr has been discharged, the output of the comparator 304 generates a logic level "0" at the time instant t2.

As shown in FIG. 4, the threshold voltage VTH is proportional to the duty cycle (D) of the power converter 100. The detailed structure of the threshold voltage generation apparatus 301 will be described below with respect to FIG. 5.

The relationship between the threshold voltage VTH and the duty cycle of the power converter 100 helps to maintain a constant switching frequency under various operating conditions. More particularly, as the load of the power converter 100 varies, the duty cycle of the power converter 100 may vary accordingly to maintain a regulated output voltage. Without having a threshold voltage proportional to the duty cycle (D) of the power converter 100, the switching frequency of the power converter 100 may fluctuate under different loading conditions. By employing the threshold voltage proportional to the duty cycle (D) of the power converter 100, the power converter 100 may maintain a stable switching frequency under various loading conditions.

As shown in FIG. 4, the turn-on time of the high-side switch S1 is from the time instant t0 to the time instant t1. The on-time of the high-side switch S1 satisfies the following equations:

$$T_{ON} \cdot \frac{VCC}{R} = C_r \cdot VTH \quad (7)$$

$$T_{ON} \cdot \frac{VCC}{R} = C_r \cdot K \cdot VCC \cdot D \quad (8)$$

Equation (8) can be simplified as the flowing equation:

$$T_{ON} = C_r \cdot K \cdot R \cdot D \quad (9)$$

Furthermore, the switching period is given by the following equation:

$$T_{SW} = \frac{T_{ON}}{D} \quad (10)$$

The switching period can be expressed as the following by replacing the on-time in Equation (10) with the on-time in Equation (9).

$$T_{SW} = C_r \cdot K \cdot R = \tau \quad (11)$$

The switching frequency is given by the following equation:

$$F_{SW} = \frac{1}{T_{SW}} = \frac{1}{\tau} \quad (12)$$

As shown by Equation (12) above, the switching frequency of the power converter 100 is kept constant regardless of the duty variations. One advantageous feature of having the threshold voltage shown in FIG. 4 is the switching frequency of the power converter 100 is kept constant or maintained in a narrow range under different loading conditions. Such an almost constant switching frequency helps to improve the performance of the power converter 100. For example, with the almost constant switching frequency, the power converter 100 is able to operate in some high-end power applications such as telecommunication power systems and the like.

Figure 5:
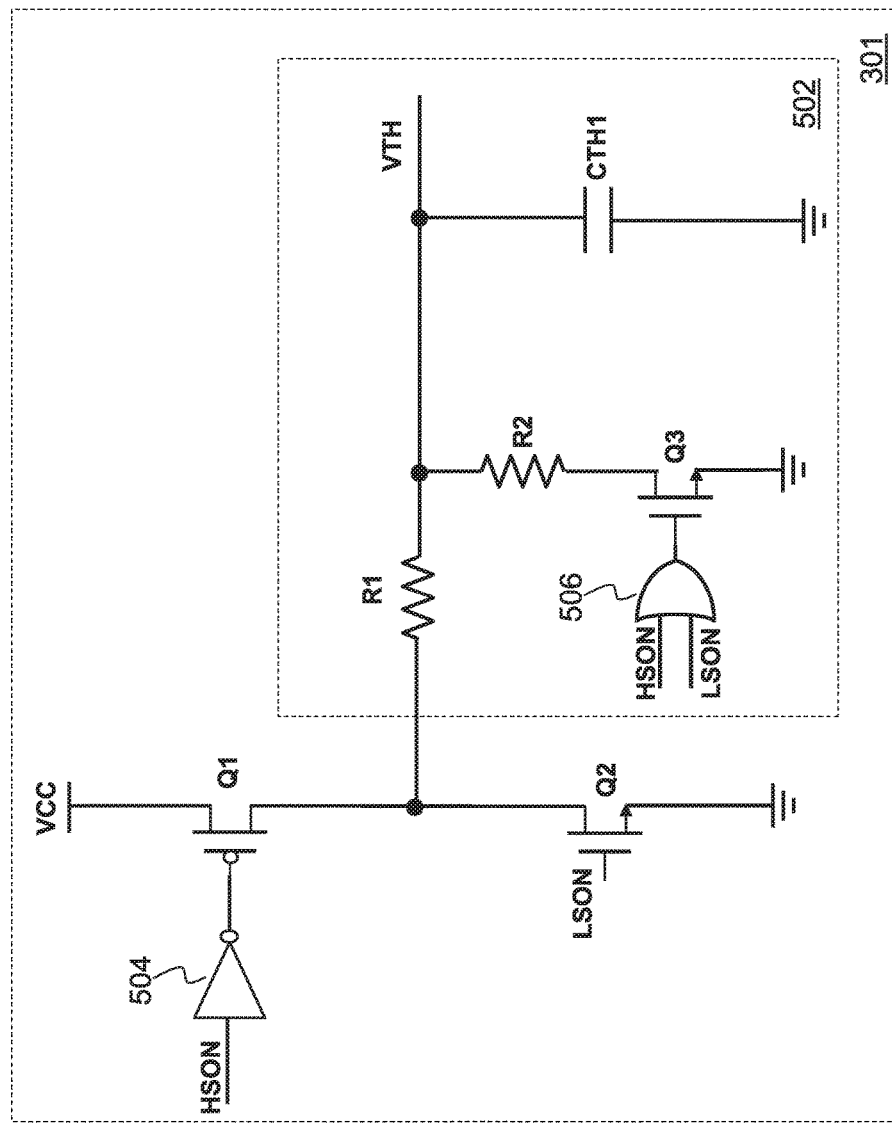
FIG. 5 illustrates a schematic diagram of a first implementation of the threshold voltage generator apparatus shown in FIGS. 3-4 in accordance with various embodiments of the present disclosure.

FIG. 5 illustrates a schematic diagram of a first implementation of the threshold voltage generator apparatus shown in FIGS. 3-4 in accordance with various embodiments of the present disclosure. The threshold voltage generation apparatus 301 comprises a first switch Q1 and a second switch Q2 connected in series between the bias voltage VCC and ground. The threshold voltage generation apparatus 301 further comprises a filtering circuit 502 connected to a common node of the first switch Q1 and the second switch Q2. As shown in FIG. 5, the threshold voltage VTH is generated at an output of the filtering circuit 502.

As shown in FIG. 5, a gate of the first switch Q1 is controlled by the high-side gate drive signal of the power converter. As shown in FIG. 5, the high-side gate drive signal HSON is applied to the gate of the first switch Q1 through an inverter 504. It should be noted that the first switch Q1 is a p-type transistor. The inverter 504 is employed to convert the high-side gate drive signal HSON into a suitable signal for driving the p-type transistor. A gate of the second switch Q2 is controlled by the low-side gate drive signal LSON of the power converter.

The filtering circuit 502 comprises a resistor divider formed by resistors R1 and R2, a control switch Q3 and a capacitor CTH1. As shown in FIG. 5, the resistor divider and the control switch Q3 are connected in series between the common node of the first switch Q1 and the second switch Q2, and ground. The control switch Q3 is controlled by both the high-side gate drive signal HSON and the low-side gate drive signal LSON. As shown in FIG. 5, the high-side gate drive signal HSON and the low-side gate drive signal LSON are applied to the gate of the control switch Q3 through an OR gate 506.

In operation, the control switch Q3 is employed to disable the discharge path of the capacitor CTH1 when both the high-side switch and the low-side switch of the power converter 100 are off. More particularly, the control switch Q3 is used to hold the threshold voltage at a suitable level during the discontinuous conduction mode (DCM) operation of the power converter 100. In some embodiments, the gate of the control switch Q3 may be controlled by an adjustable gate drive voltage. More particularly, the adjustable gate drive voltage is of a high drive voltage when at least one of the high-side switch or the low-side switch of the power converter 100 is on. The adjustable gate drive voltage is of a low drive voltage (a voltage approximately equal to the turn-on threshold of the control switch Q3) when both the high-side switch and the low-side switch of the power converter 100 are off. Such an adjustable gate drive voltage helps to improve the response of the threshold voltage generation apparatus 301.

In operation, the first switch Q1 and the second switch Q2 are controlled by the gate drive signals of the power switches S1 and S2, respectively. In alternative embodiments, the first switch Q1 and the second switch Q2 are controlled by suitable control signals that are logically equivalent to the gate drive signals of the power switches S1 and S2. When the power switches S1 and S2 are part of a step-up converter, the switch Q1 and the switch Q2 form a similar step-up converter. Throughout the filtering circuit 502, the output voltage of the threshold voltage generation apparatus 301 can be given by the following equation:

$$VTH = VCC \cdot (1-D) \cdot \frac{R2}{R1+R2} \quad (13)$$

On the other hand, when the power switches S1 and S2 are part of a step-down converter, the switch Q1 and the switch Q2 form a similar step-down converter. Throughout the filtering circuit 502, the output voltage of the threshold voltage generation apparatus 301 can be given by the following equation:

$$VTH = VCC \cdot D \cdot \frac{R2}{R1+R2} \quad (14)$$

As indicated by Equation (13), the output voltage of the threshold voltage generation apparatus 301 is proportional to one minus the duty cycle (1−D) of the power converter 100 when the power converter 100 functions as a step-up power converter. As indicated by Equation (14), the output voltage of the threshold voltage generation apparatus 301 is proportional to the duty cycle (D) of the power converter 100 when the power converter 100 functions as a step-down power converter.

One advantageous feature of having the threshold voltage generation apparatus 301 powered by the bias voltage VCC is the voltage stress on the switches (e.g., switch Q1) is controllable. In some conventional approaches, the threshold voltage generation apparatus 301 may be powered by the input voltage of the power converter 100. The input voltage may vary in a wide range, which may cause excessive voltage stress on the switches of the threshold voltage generation apparatus 301.

FIG. 6 illustrates a schematic diagram of a step-up power converter employing the constant off-time control scheme in accordance with various embodiments of the present disclosure. The step-up power converter 600 includes a first switch S1, a second switch S2, an inductor L and an output capacitor C. As shown in FIG. 6, the first switch S1 and the second switch S2 are connected in series between the output terminal VOUT and ground. The inductor L is connected between the common node of the first switch S1 and the second switch S2, and the input terminal VIN.

The control circuit of the step-up power converter 600 comprises a feedback control apparatus 202, an off-time generation apparatus 204, a PWM circuit 206, a control logic apparatus 208 and a driver circuit 210. As shown in FIG. 6, the feedback control apparatus 202 comprises a current sense apparatus 602, an error amplifier 604 and a comparator 606.

As shown in FIG. 6, the current flowing through the low-side switch S1 is detected and fed into the current sense apparatus 602. The current sense apparatus 602 converts the detected current signal into a suitable voltage signal. The output of the current sense apparatus 602 is fed into the non-inverting input of the comparator 606. The operating principle of the current sense apparatus is well known, and hence is not discussed herein.

The non-inverting input of the error amplifier 604 is configured to receive a predetermined reference voltage VREF. In some embodiments, the predetermined reference voltage VREF is equal to 0.8 V. The inverting input of the error amplifier 604 is configured to receive a voltage signal FB proportional to the output voltage of the power converter. As shown in FIG. 6, the voltage signal FB is obtained through a voltage divider formed by RB1 and RB2. The output of the error amplifier 604 is fed into the inverting input of the comparator 606. The output of the comparator 606 is fed into a reset input of the PWM circuit 206.

The off-time generation apparatus 204 includes the off-time threshold voltage generation apparatus 301 and the off-time timer apparatus 303. As shown in FIG. 6, the off-time threshold voltage generation apparatus 301 is configured to receive the off-time duty cycle (1−D) and the bias voltage VCC. The output of the off-time threshold voltage generation apparatus 301 is fed into the off-time timer apparatus 303. Furthermore, the off-time timer apparatus 303 also receives the bias voltage VCC and the PWM signal generated from the PWM circuit 206. The structures of the off-time timer apparatus 303 and the off-time threshold voltage generation apparatus 301 are discussed in detail above with respect to FIGS. 3 and 5 respectively and hence are not discussed again herein.

In some embodiments, the PWM circuit 206 is implemented as an R-S latch as shown in FIG. 6. Throughout the description, the PWM circuit 206 may be alternatively referred to as the latch 206. The set input of the latch 206 is connected to the output of the off-time generation apparatus 204. The reset input of the latch 206 is connected to the output of the comparator 606. The output of the latch 206 is connected to the gates of the switches S1 and S2 through the control logic apparatus 208 and the driver circuit 210.

In response to the output of the latch 206, the control logic apparatus 208 generates the high-side gate drive signal HSON for the high-side switch S2 and the low-side gate drive signal LSON for the low-side switch S1. The driver circuit 210 receives HSON and LSON signals and generates LSDRV signal applied to the gate of the low-side switch S1 and HSDRV signal applied to the gate of the high-side switch S2.

A timing diagram 601 illustrates the operation principle of the step-up power converter 600. At the time instant t1, the ramp voltage VCAP reaches the threshold voltage VTH. As discussed above with respect to FIG. 3, at the time instant t1, the output of the off-time generation apparatus 204 generates a logic level "1" and sends this logic level "1" to the set input of the latch 206. According to the operating principle of the R-S latch, the output of the off-time generation apparatus 204 determines the turn-on edge or the leading edge of the PWM signal. In response to the logic state change of the PWM signal, the LSON and HSON signals change their logic states accordingly at the time instant t1.

As shown in FIG. 6, the logic level "1" of LSON is applied to the gate of S1 through the driver circuit 210. As a result of the turn-on of S1, the sense current VCS increase in a linear manner from the time instant t1 to the time instant t2. From the time instant t1 to the time instant t2, the PWM signal is of a logic high state, which turns on the switch Qr of the ramp generation circuit shown in FIG. 3. As a result, the ramp capacitor is discharged and the voltage VCAP is approximately equal to zero.

At the time instant t2, the sensed current signal VCS reaches the output voltage VCTRL of the error amplifier 604. The output of the comparator 606 generates a logic level "1" and sends this logic level "1" to the reset input of the latch 206. According to the operating principle of the R-S latch, the output of the comparator 606 determines the turn-off edge or the trailing edge of the PWM signal. In response to the logic state change of the PWM signal, the LSON and HSON signals change their logic states accordingly at the time instant t2.

As shown in FIG. 6, the logic level "O0" of LSON and the logic level "1" of HSON are applied to the gates of S1 and S2 respectively through the driver circuit 210. As a result of the turn-off of S1 and the turn-on of S2, the sense current VCS drops to zero and the current source (shown in FIG. 3) charges the ramp capacitor in a linear manner from the time instant t2 to the time instant t3. At the time instant t3, the ramp voltage VCAP reaches the threshold voltage VTH again. The step-up power converter 600 enters into a new switching period.

FIG. 7 illustrates a schematic diagram of a step-down power converter employing the constant on-time control scheme in accordance with various embodiments of the present disclosure. The control circuit of the step-down power converter 700 is similar to that shown in FIG. 6 except that the feedback control apparatus 202 only comprises a comparator 702 and an inverter 710 is employed to generate the RST signal. Furthermore, the output (PUMP) of the comparator 702 is fed into the set input of the latch 206. The output of the on-time generation apparatus 204 is fed into the reset input of the latch 206.

As shown in FIG. 7, the input of the inverter 710 is configured to receive the output of the latch 206. The inverter 710 generates a signal TON/RST and applies this signal to the RST input of the on-time timer apparatus 303.

A timing diagram 701 illustrates the operation principle of the step-down power converter 700. At the time instant t1, the output voltage VFB reaches the reference voltage VREF. The comparator 702 generates a logic level "1" at PUMP and sends this logic level "1" to the set input of the latch 206. According to the operating principle of the R-S latch, the output of the comparator 702 determines the turn-on edge or the leading edge of the PWM signal. In response to the logic state change of the PWM signal, the LSON and HSON signals change their logic states accordingly at the time instant t1.

As shown in FIG. 7, the logic level "1" of HSON is applied to the gate of S1 through the driver circuit 210. From the time instant t1 to the time instant t2, the TON/RST signal is of a logic low state, which turns off the switch Qr of the ramp generation circuit shown in FIG. 4. As a result, the current source (shown in FIG. 4) charges the ramp capacitor Cr in a linear manner from the time instant t1 to the time instant t2.

At the time instant t2, the ramp voltage VCAP reaches the threshold voltage VTH. The output TOUT of the on-time timer apparatus 303 generates a logic level "1" and sends this logic level "1" to the reset input of the latch 206. According to the operating principle of the R-S latch, the output of the on-time timer apparatus 303 determines the turn-off edge or the trailing edge of the PWM signal. In response to the logic state change of the PWM signal, the LSON and HSON signals change their logic states accordingly at the time instant t2.

As shown in FIG. 7, the logic level "O0" of HSON and the logic level "1" of LSON are applied to the gates of S1 and S2 respectively through the driver circuit 210. As a result of the turn-off of S1 and the turn-on of S2, the feedback voltage VFB drops in a linear manner from the time instant t2 to the time instant t3. At the time instant t3, the feedback voltage VFB reaches the reference voltage VREF again. The step-down power converter 700 enters into a new switching period.

Figure 8:
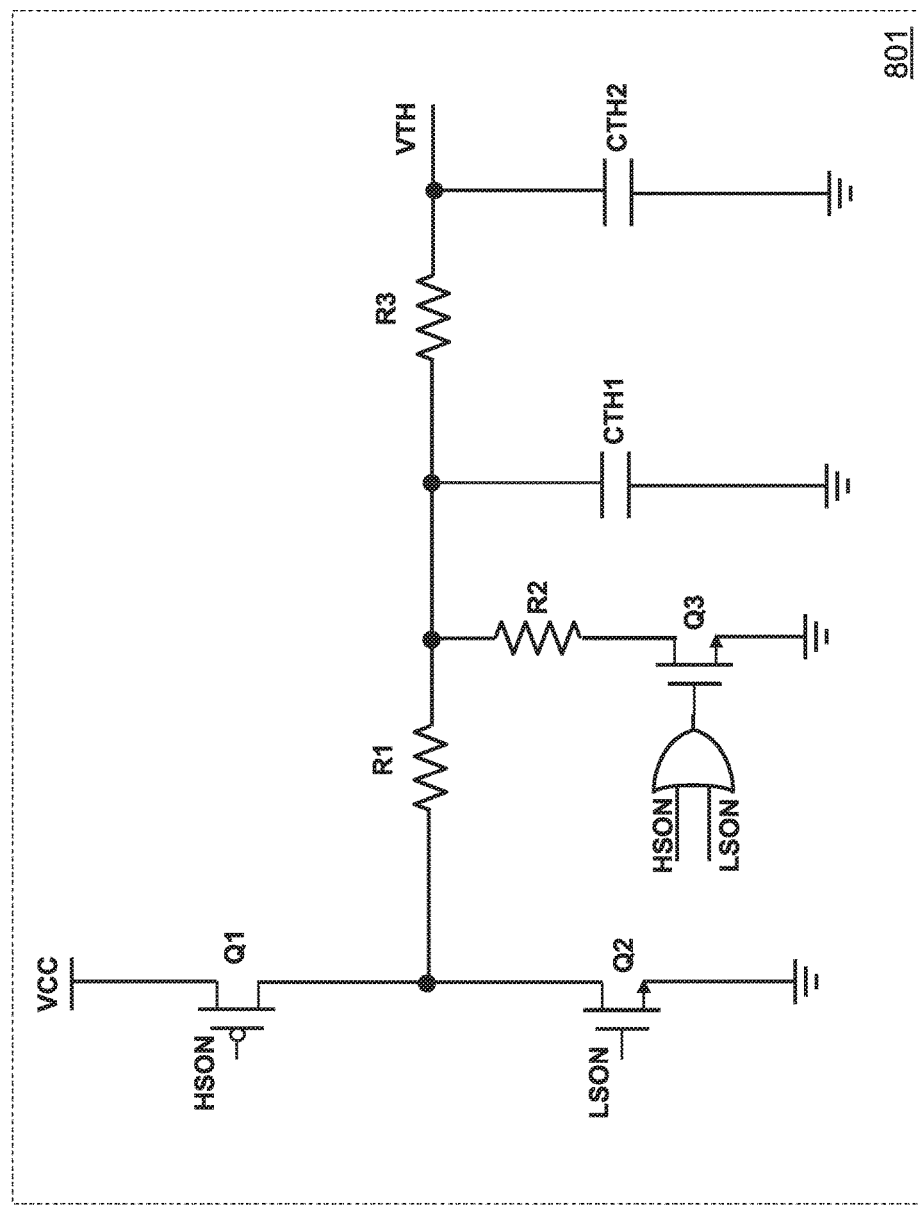
FIG. 8 illustrates a schematic diagram of a second implementation of the threshold voltage generation apparatus shown in FIGS. 3-4 in accordance with various embodiments of the present disclosure.

FIG. 8 illustrates a schematic diagram of a second implementation of the threshold voltage generation apparatus shown in FIGS. 3-4 in accordance with various embodiments of the present disclosure. The structure of the threshold voltage generation apparatus 801 is similar to the threshold voltage generation apparatus 301 shown in FIG. 5 except that the filtering circuit is implemented as a two-stage filter. The first stage of the filtering circuit comprises resistors R1, R2 and capacitor CTH1. The second stage of the filter stage of the filtering circuit comprises resistor R3 and capacitor CTH2. As shown in FIG. 8, the first stage and the second stage are connected in cascade.

One advantageous feature of having the two-stage filter is the filtering circuit shown in FIG. 8 provides more design flexibility, thereby improving the performance of the threshold voltage generation apparatus 801.

Figure 9:
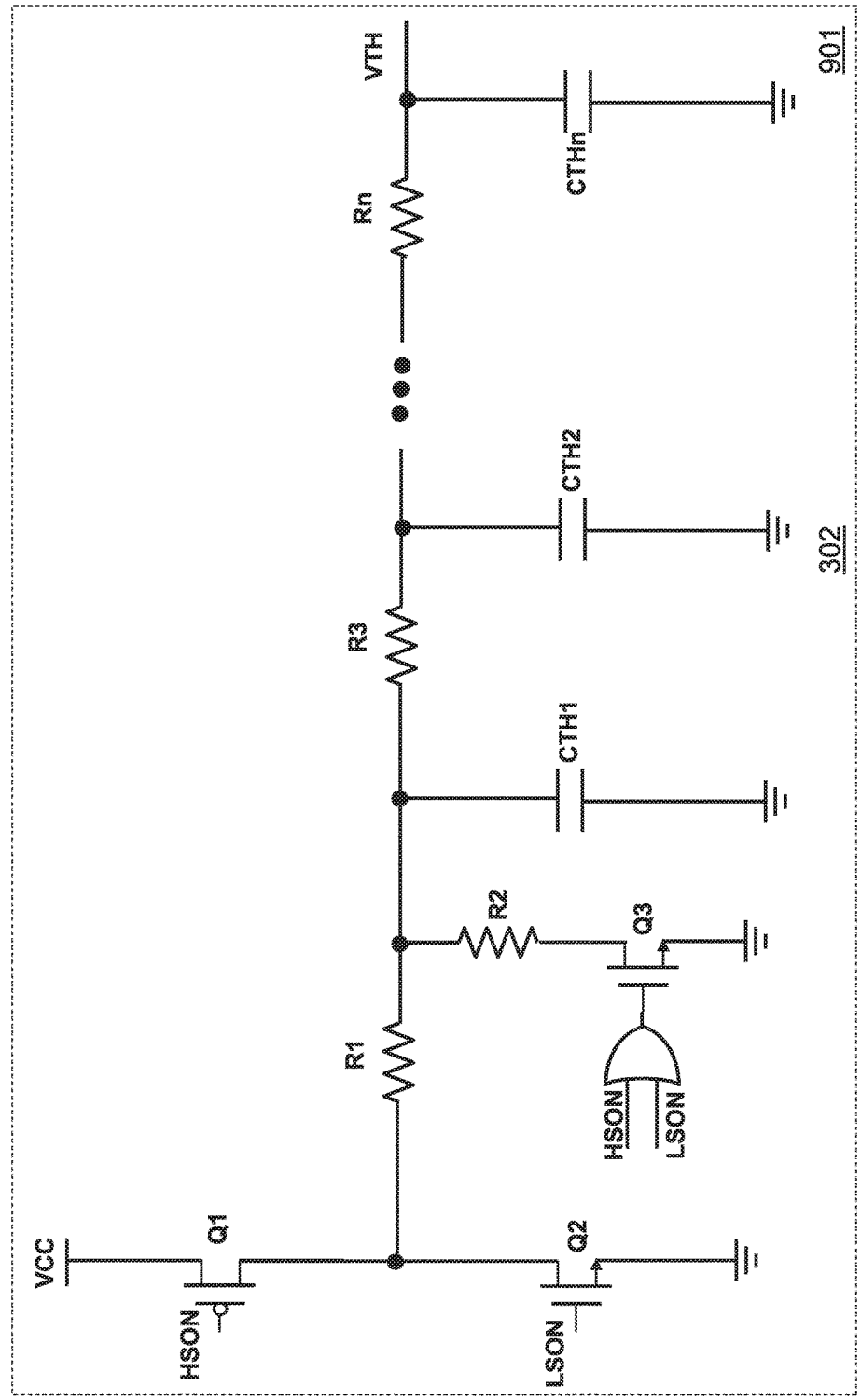
FIG. 9 illustrates a schematic diagram of a third implementation of the threshold voltage generation apparatus shown in FIGS. 3-4 in accordance with various embodiments of the present disclosure.

FIG. 9 illustrates a schematic diagram of a third implementation of the threshold voltage generation apparatus shown in FIGS. 3-4 in accordance with various embodiments of the present disclosure. The structure of the threshold voltage generation apparatus 901 is similar to the threshold voltage generation apparatus 301 shown in FIG. 5 except that the filtering circuit comprises a plurality of filter stages. The first stage of the filter comprises resistors R1, R2 and capacitor CTH1. The second stage of the filter comprises resistor R3 and capacitor CTH2. The nth stage of the filter comprises resistor Rn and capacitor CTHn. As shown in FIG. 9, the plurality of filter stages is connected in cascade.

One advantageous feature of having the plurality filter stages is the filter circuit shown in FIG. 9 provides more design flexibility, thereby improving the performance of the threshold voltage generation apparatus 901.

Figure 10:
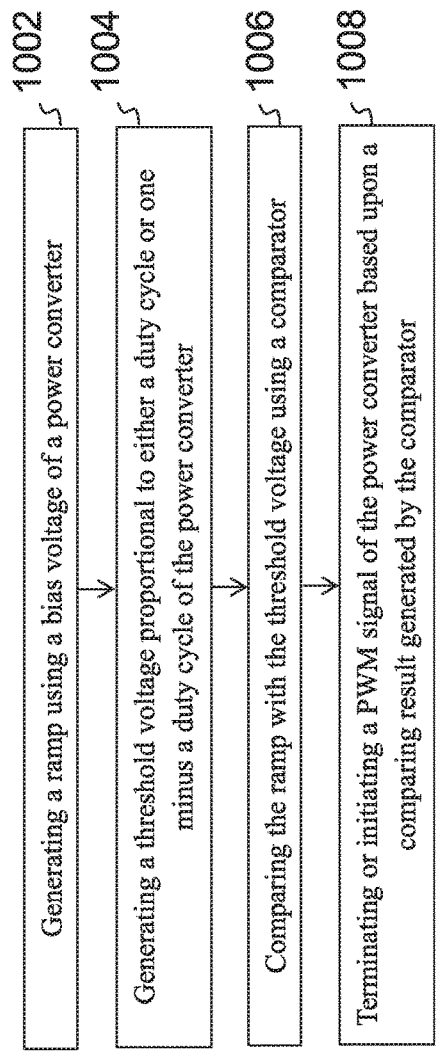
FIG. 10 illustrates a flow chart of a method for controlling the power converter shown in FIG. 2 in accordance with various embodiments of the present disclosure.

FIG. 10 illustrates a flow chart of a method for controlling the power converter shown in FIG. 2 in accordance with various embodiments of the present disclosure. This flowchart shown in FIG. 10 is merely an example, which should not unduly limit the scope of the claims. One of ordinary skill in the art would recognize many variations, alternatives, and modifications. For example, various steps illustrated in FIG. 10 may be added, removed, replaced, rearranged and repeated.

At step 1002, a bias voltage is used to generate a ramp signal. More particularly, a current source is generated by the bias voltage. The current level of the current source is proportional to the bias voltage. The current source is used to charge a ramp capacitor.

At step 1004, a threshold voltage is generated by a threshold voltage generation apparatus. When the power converter is implemented as a step-up converter, the threshold voltage is proportional to one minus the duty cycle (1–D) of the step-up converter. On the other hand, when the power converter is implemented as a step-down converter, the threshold voltage is proportional to the duty cycle (D) of the step-down converter.

At step 1006, the ramp voltage and the threshold voltage are compared at a comparator. More particularly, the ramp voltage is fed into a non-inverting input of the comparator. The threshold voltage is fed into an inverting input of the comparator.

At step 1008, after the ramp voltage reaches the threshold voltage, the output of the comparator generates a logic state change, which terminates or initiates a PWM signal of the power converter. In some embodiments, when the power converter is implemented as a step-up converter, the logic state change of the comparator terminates the off-time signal and initiates a PWM signal of the step-up converter. In alternative embodiments, when the power converter is implemented as a step-down converter, the logic state change of the comparator terminates the on-time signal (e.g., the PWM signal) of the step-down converter.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
a timer coupled between a bias voltage and ground, wherein the timer comprises a first input configured to receive a ramp, a second input configured to receive a threshold voltage and an output configured to be connected to an input of a PWM circuit, wherein the output of the timer is used for setting either an on-time or an off-time of a power converter, and wherein both the ramp and the threshold voltage are proportional to the bias voltage, and wherein as a result of having both the ramp and the threshold voltage proportional to the bias voltage, the PWM circuit has a constant switching frequency; and
a threshold generator coupled between the bias voltage and ground, wherein the threshold generator is configured to receive a plurality of control signals of the power converter and generate the threshold voltage based upon a duty cycle of the power converter.

2. The apparatus of claim 1, wherein the threshold generator comprises:
a first switch and a second switch connected in series between the bias voltage and ground; and
a filtering circuit connected to a common node of the first switch and the second switch, and wherein the threshold voltage is generated at an output of the filtering circuit.

3. The apparatus of claim 2, wherein:
a gate of the first switch is controlled by a first gate drive signal of the power converter; and
a gate of the second switch is controlled by a second gate drive signal of the power converter.

4. The apparatus of claim 2, wherein the filtering circuit comprises:
a resistor divider, a control switch and a capacitor, and wherein the resistor divider and the control switch are connected in series between the common node of the first switch and the second switch, and ground, and wherein the capacitor is between the output of the filtering circuit and ground.

5. The apparatus of claim 1, wherein the timer comprises:
a comparator having a first input configured to receive the ramp, a second input configured to receive the threshold voltage and an output for setting an on-time of a step-down power converter.

6. The apparatus of claim 5, wherein:
the threshold voltage is proportional to a duty cycle of the step-down power converter.

7. The apparatus of claim 1, wherein the timer comprises:
a comparator having a first input configured to receive the ramp, a second input configured to receive the threshold voltage and an output for setting an off-time of a step-up power converter.

8. The apparatus of claim 7, wherein:
the threshold voltage is proportional to one minus a duty cycle of the step-up power converter.

9. A method comprising:
generating a ramp using a bias voltage of a power converter;
generating a threshold voltage proportional to either a duty cycle or one minus a duty cycle of the power converter;
comparing the ramp with the threshold voltage using a comparator, and
terminating or initiating a PWM signal of the power converter based upon a comparing result generated by the comparator, and wherein both the ramp and the threshold voltage are proportional to the bias voltage, and wherein as a result of having both the ramp and the threshold voltage proportional to the bias voltage, the PWM signal has a constant switching frequency.

10. The method of claim 9, further comprising:
generating the threshold voltage proportional to a duty cycle of a step-down power converter;
comparing the ramp with the threshold voltage using the comparator; and terminating an on-time or the PWM signal of the step-down power converter based upon the comparing result generated by the comparator.

11. The method of claim 9, further comprising:
generating the threshold voltage proportional to one minus a duty cycle of a step-up power converter;
comparing the ramp with the threshold voltage using the comparator; and
terminating an off-time and initiating the PWM signal of the step-up power converter based upon the comparing result generated by the comparator.

12. The method of claim 11, further comprising:
generating the threshold voltage using a threshold generator, wherein the threshold generator comprises:
   a first switch and a second switch connected in series between the bias voltage and ground; and
   a filtering circuit connected to a common node of the first switch and the second switch, and wherein the threshold voltage is generated at an output of the filtering circuit.

13. The method of claim 12, further comprising:
configuring the first switch to operate in sync with a high-side switch of the step-up power converter; and
configuring the second switch to operate in sync with a low-side switch of the step-up power converter.

14. The method of claim 12, further comprising:
configuring the first switch to operate in sync with a high-side switch of the step-down power converter through applying a gate drive signal of the high-side switch to the first switch; and
configuring the second switch to operate in sync with a low-side switch of the step-down power converter through applying a gate drive signal of the low-side switch to the first switch.

15. The method of claim 12, further comprising:
generating a current source based upon the bias voltage; and
charging a ramp capacitor using the current source to generate the ramp.

16. A converter comprising:
a high-side switch and a low-side switch connected in series;
an inductor connected to a common node of the high-side switch and the low-side switch; and
a control apparatus configured to generate gate drive signals for the high-side switch and the low-side switch, wherein the control apparatus comprises:
   a timer for setting either an on-time or an off-time of the converter based on comparing a ramp to a threshold voltage, and wherein both the ramp and the threshold voltage are proportional to a bias voltage, wherein as a result of having the ramp and the threshold voltage proportional to the bias voltage, the gate drive signals have a constant switching frequency; and
   a threshold generator configured to receive the gate drive signals of the converter and generate the threshold voltage based upon a duty cycle of the converter.

17. The converter of claim 16, wherein:
the high-side switch and the low-side switch connected in series between an output of the converter and ground;
the inductor connected between the common node of the high-side switch and the low-side switch, and an input of the converter; and
the timer is configured to set an off-time of the low-side switch.

18. The converter of claim 17, wherein:
the timer comprises a first input configured to receive the ramp, a second input configured to receive the threshold voltage and an output configured to be connected to an input of a PWM circuit, wherein the threshold voltage is proportional to one minus a duty cycle of the converter.

19. The converter of claim 16, wherein:
the high-side switch and the low-side switch connected in series between an input of the converter and ground;
the inductor connected between the common node of the high-side switch and the low-side switch, and an output of the converter; and
the timer is configured to set an on-time of the high-side switch.

20. The converter of claim 19, wherein:
the timer comprises a first input configured to receive the ramp, a second input configured to receive the threshold voltage and an output configured to be connected to an input of a PWM circuit, wherein the threshold voltage is proportional to a duty cycle of the converter.

\* \* \* \* \*

UNITED STATES PATENT AND TRADEMARK OFFICE
CERTIFICATE OF CORRECTION

Page 1 of 1

PATENT NO. : 10,476,387 B1
APPLICATION NO. : 15/980846
DATED : November 12, 2019
INVENTOR(S) : Xiaoyu Xi et al.

It is certified that error appears in the above-identified patent and that said Letters Patent is hereby corrected as shown below:

In Column 16, Line 54-55, Claim 9, delete "comparing the ramp with the threshold voltage using a comparator, and" and insert --comparing the ramp with the threshold voltage using a comparator; and--.

Signed and Sealed this
Seventeenth Day of March, 2020

Andrei Iancu
*Director of the United States Patent and Trademark Office*